United States Patent
Williams et al.

(10) Patent No.: US 10,604,136 B1
(45) Date of Patent: Mar. 31, 2020

(54) PARKING BRAKE ALARM SYSTEMS

(71) Applicant: SBS, Incorporated, Silverton, OR (US)

(72) Inventors: Frank Williams, Silverton, OR (US); Bannion Frank Allen, Silverton, OR (US)

(73) Assignee: SBS, Incorporated, Silverton, OR (US)

( * ) Notice: Subject to any disclaimer, the term of this patent is extended or adjusted under 35 U.S.C. 154(b) by 0 days.

(21) Appl. No.: 16/368,529

(22) Filed: Mar. 28, 2019

Related U.S. Application Data

(60) Provisional application No. 62/650,273, filed on Mar. 29, 2018.

(51) Int. Cl.
  *B60T 17/22* (2006.01)
  *F16D 66/00* (2006.01)
  *B60T 7/04* (2006.01)

(52) U.S. Cl.
  CPC ............ *B60T 17/22* (2013.01); *B60T 7/045* (2013.01); *B60Y 2302/03* (2013.01); *B60Y 2400/306* (2013.01); *B60Y 2400/81* (2013.01)

(58) Field of Classification Search
  CPC ....................................................... B60T 17/22
  See application file for complete search history.

(56) References Cited

U.S. PATENT DOCUMENTS

| | | | |
|---|---|---|---|
| 2004/0061446 A1* | 4/2004 | Rhodes | B60R 16/0207 315/77 |
| 2004/0124697 A1* | 7/2004 | MacGregor | B60T 17/08 303/89 |
| 2016/0366817 A1* | 12/2016 | Albinger | A01D 34/6818 |
| 2017/0101067 A1* | 4/2017 | Carleial | B60R 16/023 |

* cited by examiner

*Primary Examiner* — Joseph H Feild
*Assistant Examiner* — Pameshanand Mahase
(74) *Attorney, Agent, or Firm* — DWC Law Firm, P.S.

(57) ABSTRACT

Circuits for providing to an operator warning interfaced system of a transportation vehicle a conductive path to ground or voltage source are described herein. The operator warning interface system, when provided a conductive path to ground or voltage source, may generate an audio and/or visual alert that indicates that the parking brake of the transportation vehicle is disengaged. The circuits may include at least one switch that when integrated into a safety and warning system of a transportation vehicle and when closed provides a conductive path to ground or voltage source to an operator warning interface system of the transportation vehicle, where the switch closes when the parking brake of the transportation vehicle is disengaged. In some implementations, the circuits may further include a second switch that must be closed in order to provide the conductive path to ground or voltage source. The second switch may close when the vehicle ignition is turned off.

19 Claims, 9 Drawing Sheets

PARKING BRAKE ALARM SYSTEMS

CROSS REFERENCE TO RELATED APPLICATION(S)

This application claims priority to U.S. Provisional Patent Application Ser. No. 62/650,273, filed on Mar. 29, 2018, which is incorporated herein by reference in its entirety.

BACKGROUND

1. Technical Field

The present disclosure relates to vehicle warning systems, and more particularly, to systems for use in providing a warning that a parking brake of a vehicle has not been actuated.

2. Description of Related Art

Heavy-duty vehicles such as trucks, buses, and so forth employ air or hydraulic parking brake systems. Over the years, both federal and state regulatory agencies have contemplated or have enacted regulations regarding the use of and incorporation of various safety features related to parking brakes in these heavy-duty vehicles in order to ensure public safety. In other cases, other safety features for brakes have been incorporated by automakers into both heavy-duty as well as passenger vehicle without being prompted by regulations.

Currently, many vehicles including passenger vehicles provide an affirmative indication (e.g., a visible light or icon that is displayed on the driver instrument panel) that a parking brake is actuated (e.g., the parking brake is set or activated) when the ignition is turned-on to prevent the vehicle from being driven with the parking brake actuated. However, such systems cannot provide an affirmative indication that a parking brake of a vehicle is not set when the vehicle's ignition has been turned off or even when the vehicle's ignition is still turned-on. In some cases, this could result in an unoccupied vehicle, which may or may not be running, rolling away endangering the public. California regulators recently have enacted regulations that require school buses to have a system that will alert an operator of a school bus that the parking brake of the school bus is not actuated (e.g., not set or disabled).

SUMMARY

In a first embodiment, a first circuit is provided for providing a conductive path to ground to an operator warning interface system of a transportation vehicle that generates an audio and/or visual alert to indicate that the parking brake of the transportation vehicle is disengaged when the operator warning interface system is provided with the conductive path to ground. The first circuit includes a first switch that closes in response to the parking brake of the transportation vehicle being disengaged. The first circuit further includes a second switch that is coupled to the first switch and that closes when an ignition of the transportation vehicle is turned off. For the first embodiment, the first switch and the second switch are disposed in series between a first node and a second node, the first node to couple with the operator warning interface system and the second node to couple with ground, the first switch and the second switch forming at least a portion of a conductive path between the operator warning interface system and the ground when the first node is coupled to the operator warning interface system and the second node is coupled to the ground and when the first and second switches are closed.

In an alternative embodiment, an operator warning interface system of a transportation vehicle may generate an audio and/or visual alert to indicate that the parking brake of the transportation vehicle is disengaged when the operator warning interface system is provided with a conductive path to voltage source (e.g., battery). In this embodiment, the first circuit may provide to the operator warning interface system a conductive path to voltage source when the first and switches are closed.

In a second embodiment a second circuit is provided that includes a first relay including a first relay switch that closes when an ignition of the transportation vehicle is turned off. The second circuit further includes a second relay including a second relay switch that is coupled to the first relay switch and that closes when a parking brake of the transportation vehicle is disengaged. For the second embodiment, the first relay switch and the second relay switch are disposed in series between an operator warning interface system and ground to form a breakable conductive path between the operator warning interface system and the ground. The first relay switch and the second relay switch to form at least a portion of an unbroken conductive path between the operator warning interface system and the ground when the first relay switch and the second relay switch are closed, the operator warning interface system to generate an audio and/or visual alert to indicate that the parking brake of the transportation vehicle is disengaged when the operator warning interface system is provided with the unbroken conductive path to the ground.

In an alternative embodiment, an operator warning interface system of a transportation vehicle may generate an audio and/or visual alert to indicate that the parking brake of the transportation vehicle is disengaged when the operator warning interface system is provided with an unbroken conductive path to a voltage source (e.g., battery). In this embodiment, the second circuit may provide to the operator warning interface system an unbroken conductive path to voltage source when the first and second relays are closed.

In a third embodiment a third circuit is provided that includes a first node for coupling to ground. The third circuit also includes a second node for coupling to a cathode of a battery. The third circuit further includes a third node for coupling to an operator warning interface system that is configured to, when prompted, provide an audio and/or visual indicator for indicating that a parking brake of the transportation vehicle is disengaged. The third circuit further includes a relay switch to conductively link the third node to the first node when the parking brake of the vehicle is not set and to conductively link the third node to the second node when the parking brake of the transportation vehicle is actuated. In an alternative embodiment, the first node may be coupled to a cathode of a battery while the first node may be coupled with ground.

DETAILED DESCRIPTION

Figure 1:
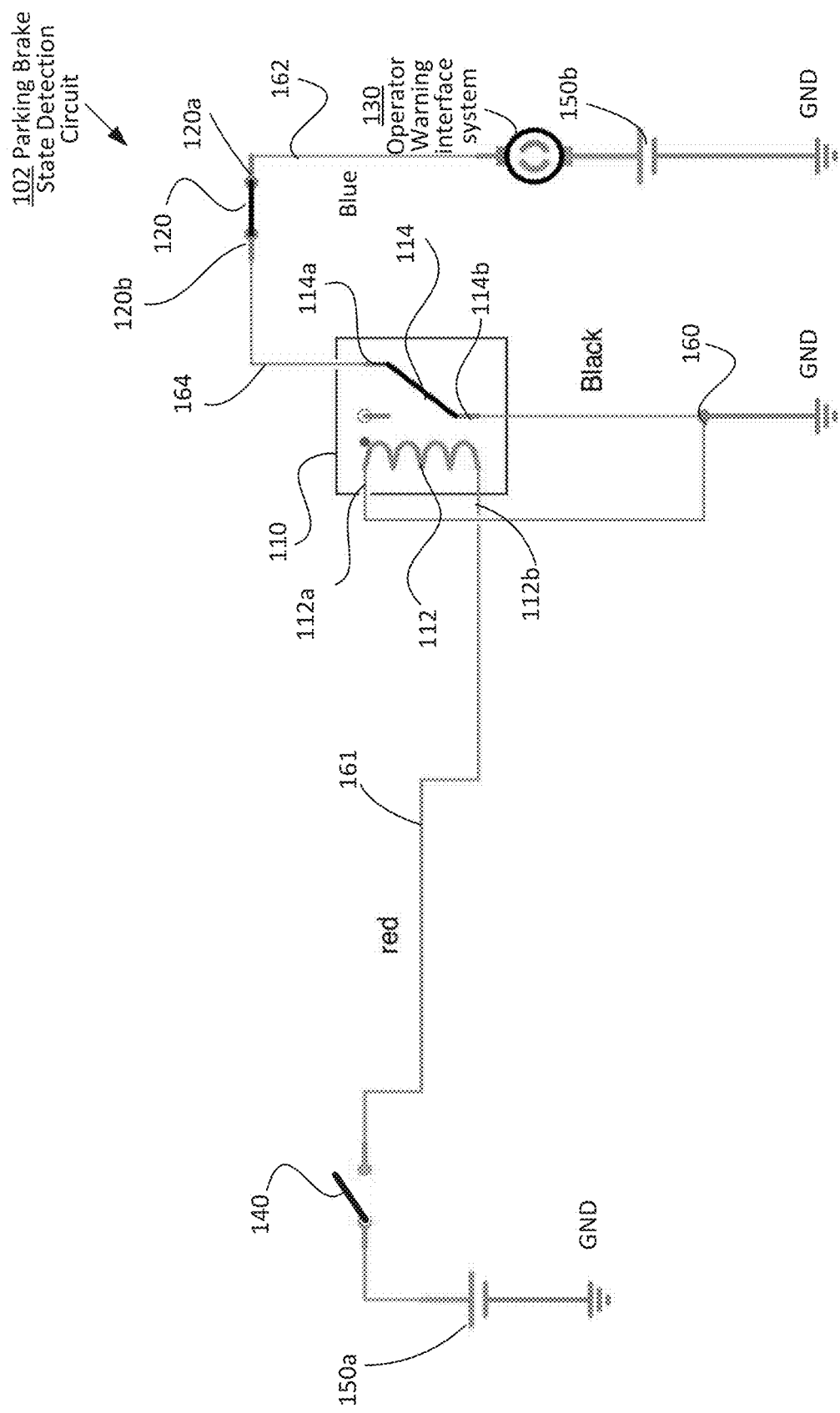
FIG. 1 illustrates a parking brake alert system according to some embodiments.

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

Various embodiments in this disclosure are described in the context of parking brakes for large heavy-duty vehicles. However, and as will be understood by those skilled in the art after reviewing this disclosure, the embodiments may be suitable for use in other environments (e.g., in the context of other types of transportation vehicles including private passenger vehicles or other light-weight or light-duty vehicles such as vans and light trucks), and may be modified in the spirit of this disclosure to accommodate those environments.

According to various embodiments, circuits (hereinafter "parking brake state detection circuits") are provided that may be incorporated into the safety and warning systems of transportation vehicles, such as a heavy-duty vehicle, and that provide to an operator warning interface system of the transportation vehicles ground signals (e.g., ground) or voltage signals (e.g., voltage or current) in response, at least in part, to detecting that the parking brake of the transportation vehicle is disengaged or disabled (e.g., not actuated). By providing ground or voltage to the operator warning interface system, the operator warning interface system may generate an audio and/or visual alert that warns the vehicle operator that the vehicle parking park is disabled. As will be further described herein the parking brake state detection circuits to be described herein may be in modular form that may be integrated into, for example, existing safety and warning systems of transportation vehicles.

Whether a ground or voltage signal is provided to the operator warning interface system when the parking brake is disabled will depend on the specific configuration of the operator warning interface system and/or the overall safety and warning system of the transportation vehicle. For example, in some cases, an operator warning interface system may be configured to generate an audio and/or visual alert that indicates that the parking brake is disengaged only when it is provided with a conductive path to ground. In other cases, however, an operator warning interface system may be configured to generate an audio and/or visual alert only when it is provided with a conductive path to battery (e.g., voltage source).

In some embodiments, the ground or voltage signals may be provided to an operator warning interface system of a transportation vehicle only when both the parking brake of the transportation vehicle is detected as being disabled and the vehicle ignition has been turned off. In other embodiments, however, the ground or voltage signal may be provided to an operator warning interface system whenever the parking brake of the transportation vehicle is detected as being disabled regardless of whether the vehicle ignition has been turned on or off.

As noted above, an operator warning interface system may be configured to, upon being provided with ground or non-ground (e.g., voltage) signals, or positive or non-positive signal or any combination thereof, generate an affirmative visual and/or audio alert to the operator of the transportation vehicle that the parking brake of the transportation vehicle is disengaged. For these embodiments, the ground or non-ground signals may be provided by providing to the operator warning interface system an electrical or conductive path for providing the ground or non-ground signals (e.g., providing conductive path to ground or to a voltage/current source such as a battery).

As will be further described herein, in a first embodiment, a first parking brake state detection circuit is provided that may include a first switch and a relay that includes a second switch (which may also be referred to as a "relay switch"), where when the first parking brake state detection circuit is integrated into a safety and warning system of a transportation vehicle the first and second switches will be disposed in series along a breakable conductive (e.g., electrically conductive) path between ground and an operator warning interface system. The conductive path that is provided by the parking brake state detection circuit is referred to herein as "breakable" because the conductive path may exist only if both the first switch and the second switch are closed.

Figure 3:
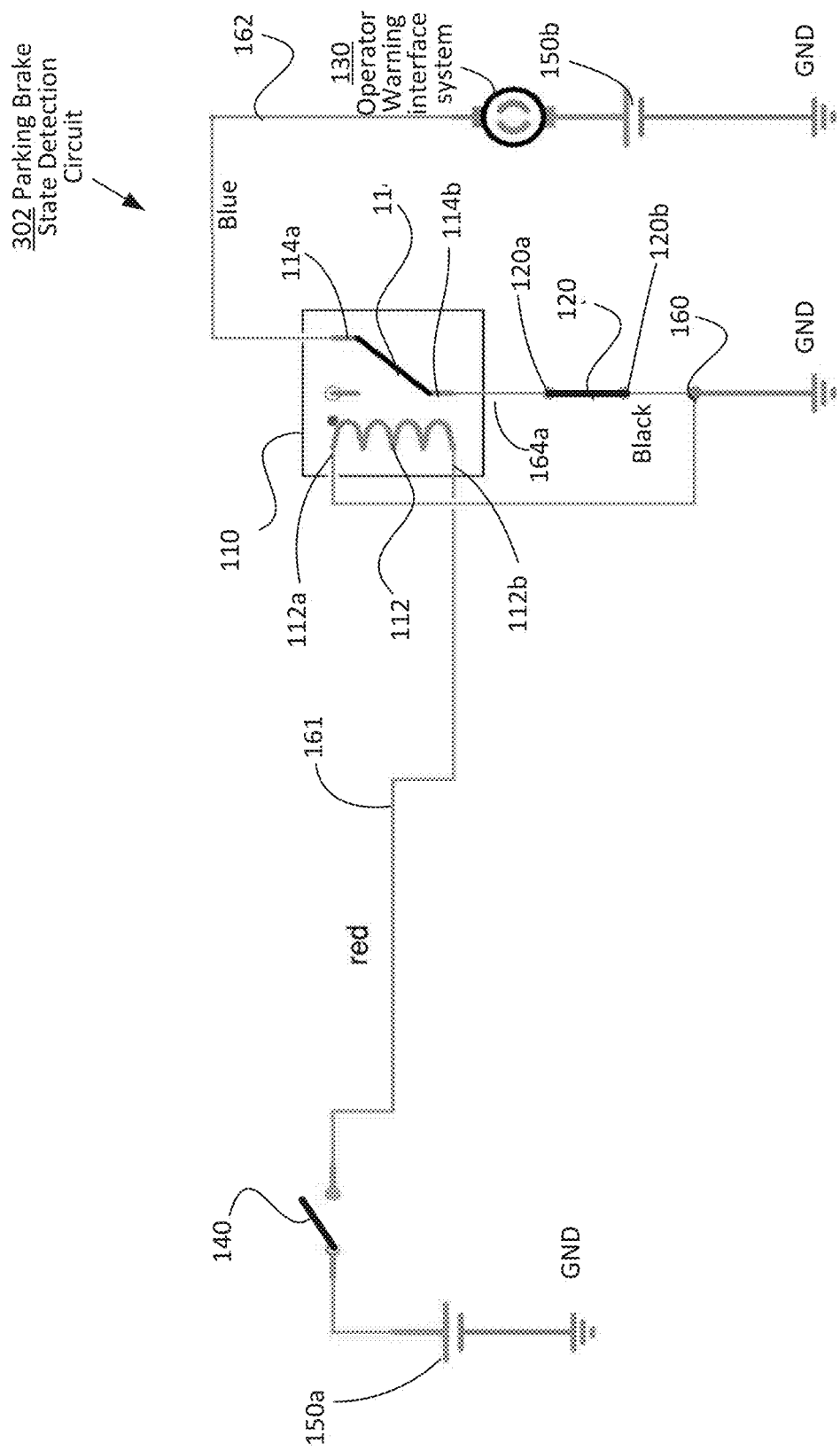
FIG. 3 illustrates another parking brake alert system according to some embodiments.

In various embodiments, the relay may include, in addition to the second switch, a coil, where the second switch is configured to open or close depending on whether the coil (e.g., inductor) is or is not energized (e.g., current flowing or not flowing through the coil). In this embodiment, the operator warning interface system may be configured to generate an audio and/or visual alert when a conductive path to ground is provided to it. FIGS. 1 and 3 illustrates example parking brake state detection circuits according to the first embodiment. Note that in various embodiments the first parking brake state detection circuit described herein as well as the other parking brake state detection circuits to be described below may be provided in modular form (see, for example, control module 402 of FIG. 4) that may be incorporated into, for example, existing or yet to be developed safety and warning systems of transportation vehicles.

In various embodiments, the second switch (i.e., relay switch of the relay) of the first parking brake state detection circuit may close (or open in some alternative embodiments as will be further described herein) when the ignition of the transportation vehicle is turned-off (e.g., the ignition switch is open), while the first switch of the first parking brake state detection circuit will be closed when the parking brake of the transportation vehicle is disabled (e.g., disengaged or deactivated). For example, in vehicles that employ an air brake, the switch may be closed when pressure in the delivery line of the air brake system is detected, for example, as being above a particular level of pressure such as greater than 6-11 psi (pounds per square inch), thus indicating that the air parking brake has not been actuated. Upon the first and second switches closing, a conductive path to ground is provided to the operator warning interface system, which causes the operator warning interface system to provide an audio and/or visual alert that indicates that the parking brake of the transportation vehicle is not actuated even though the vehicle ignition has been turned-off. Note that in some alternative embodiments, a parking brake state detection circuit may be configured such that when the relay and the switch close, a conductive path to a voltage source (e.g., a battery) may be provided to an operator warning interface system rather than a conductive path to ground to prompt the operator warning interface system to provide the audio and/or visual alert that indicates that the parking brake is not actuated.

Figure 2:
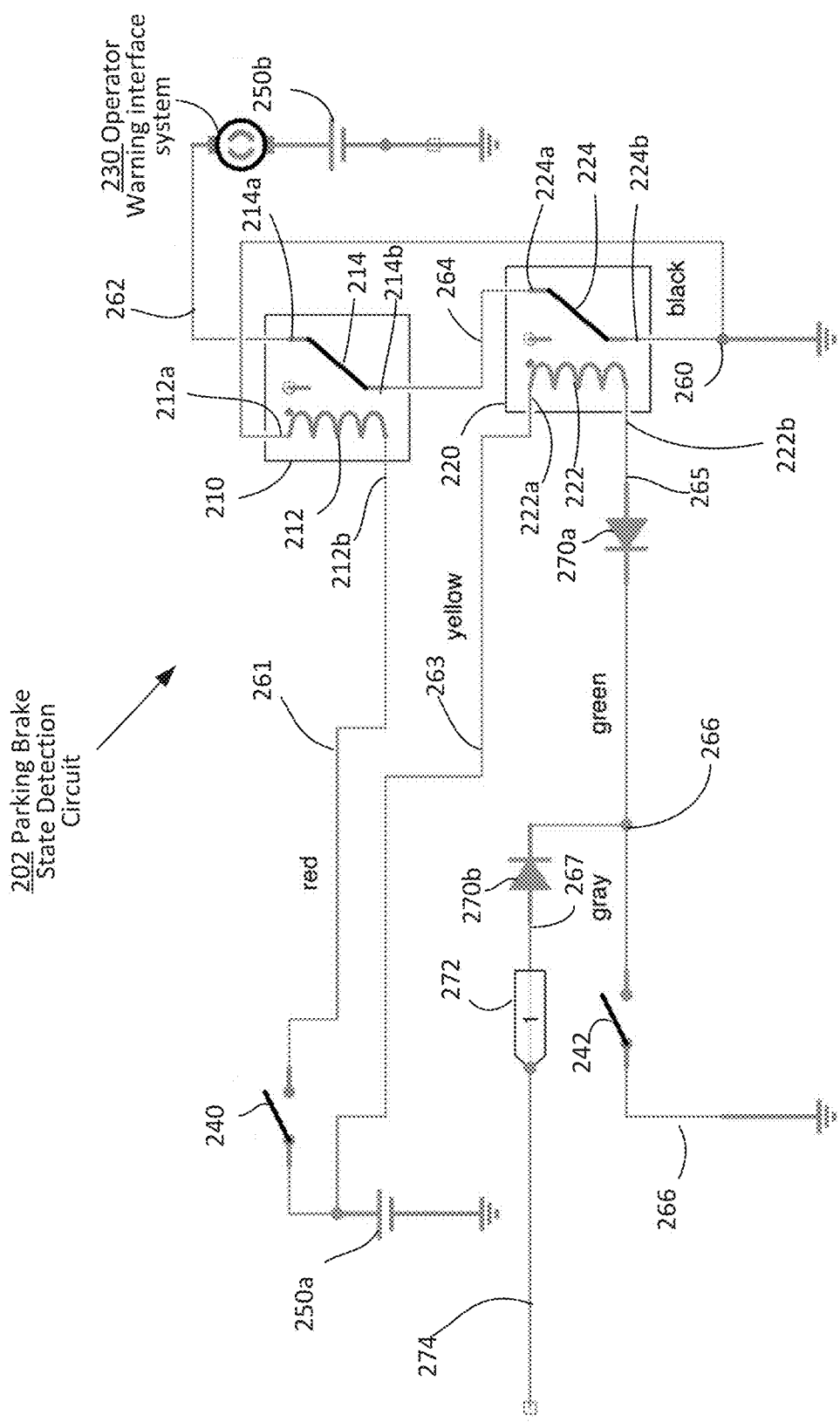
FIG. 2 illustrates another parking brake alert system according to some embodiments.

In a second embodiment, a second parking brake state detection circuit is provided that includes a first relay and a second relay, or equivalence thereof, and that may be incorporated into the safety and warning system of a transportation vehicle. When the second parking brake state detection circuit is, in fact, integrated into a safety and warning system of a transportation vehicle, the first and second relays may be disposed in series along a breakable conductive path between ground and an operator warning interface system. In various embodiments, each of the first and second relay includes a coil/relay switch pair where the relay switch of a coil/relay switch pair will open or close depending on whether the corresponding coil is energized or not (e.g., whether or not there is an electrical current flowing through the coil). When the second parking brake state detection circuit is integrated into a safety and warning system of a transportation vehicle, the conductive path that is provided by the second parking brake state detection circuit according to the second embodiment is "breakable," for example, because the conductive path may exist only if both the first and second relays are closed. That is, when both the first relay switch of the first relay and the second relay switch of the second relay are closed, an unbroken conductive path may be formed between the operator warning interface system and the ground. For the embodiment, such a parking brake state detection circuit, an example of which is illustrated in FIG. 2, may be employed in a transportation vehicle, such as a heavy-duty vehicle that employs, for example, a hydraulic brake system, an air brake system, or other types of braking systems.

In some cases, the first relay switch of the second parking brake state detection circuit according to the second embodiment may close when the parking brake is detected as being disabled or not actuated. For example, the first relay switch may be closed when the ignition of the transportation vehicle is turned-off (e.g. the ignition switch is open). In contrast, the second relay switch of the second relay may close when a parking brake switch (e.g., a switch that is linked to a parking brake activation mechanism such as a parking brake button, a parking brake lever, a parking brake pedal, and so forth) is in the open position (e.g., parking brake is disengaged). In other cases, the second relay switch may close when the transportation vehicle employs an air brake system and the pressure of the delivery line of the air brake system is detected as being greater than, for example, 6-11 psi.

In other words, the first relay switch and the second relay switch may close when the parking brake is disengaged and when the vehicle ignition is turned off. Upon both the first and second relay switches closing, a conductive path to ground is provided to the operator warning interface system, which causes the operator warning interface system to provide an audio and/or visual alert that indicates that the parking brake of the heavy-duty vehicle is not actuated even though the ignition has been turned-off.

Alternatively, the second parking brake state detection circuit according to the second embodiment may be configured such that instead of providing a conductive path to ground to the operator warning interface system in order to cause the operator warning interface system to generate the audio and/or visual alert indicating that the parking brake is deactivated, the first and second relay switches, when closed, may provide a conductive path to a battery (e.g., voltage source) to the operator warning interface system in order to cause the operator warning interface system to generate the audio and/or visual alert. That is, depending on the configuration of the operator warning interface system, the operator warning interface system may need a conductive path to ground or a conductive path to a voltage source in order to generate an audio and/or visual alert that indicates that the parking brake is disengaged. This is demonstrated in FIG. 8, which illustrates a parking brake state detection circuit 802 that provides to an operator warning interface system 230 a conductive path to a battery 250b when a first relay switch 214 and a second relay switch 224 are closed.

Figure 5:
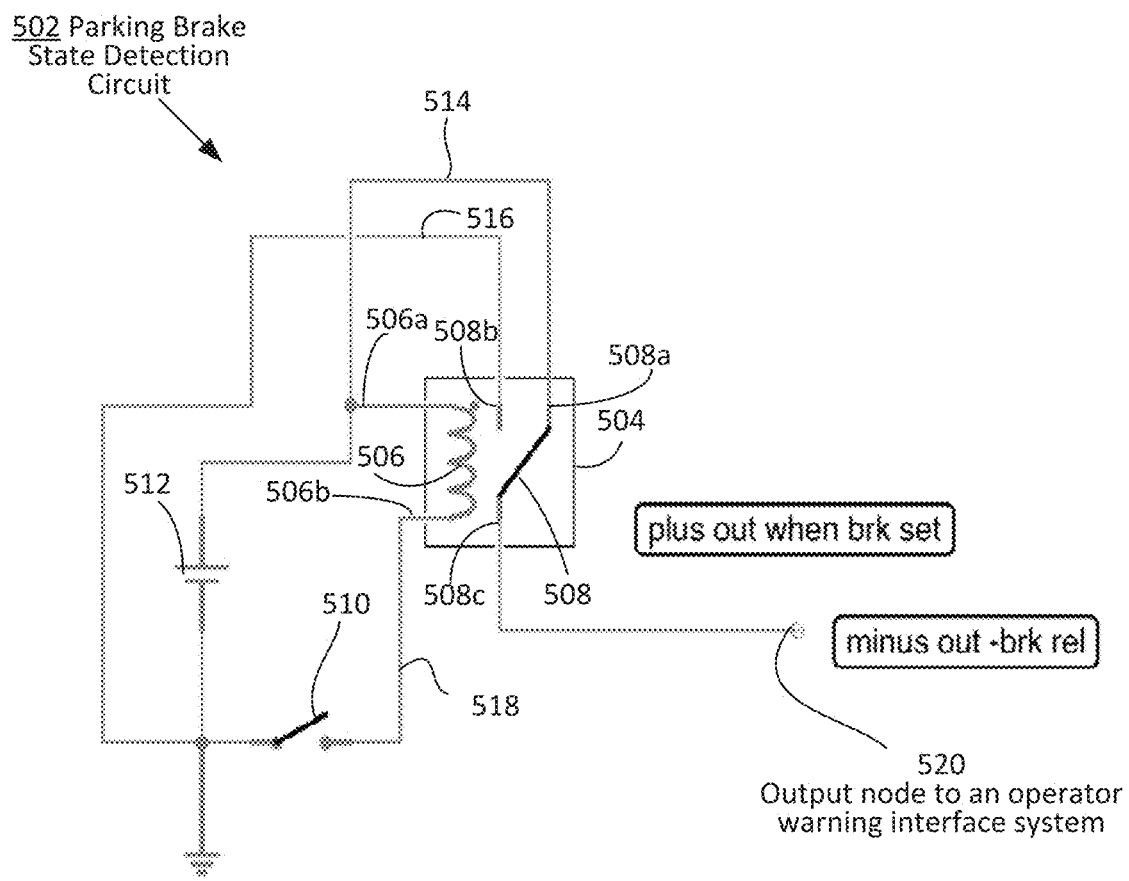
FIG. 5 illustrates another parking brake state detection circuit according to some embodiments.

In a third embodiment, a third parking brake state detection circuit is provided that when integrated into a safety and warning system of a transportation vehicle, such as a heavy-duty vehicle, may provide to an operator warning interface system a plus output (e.g., a conductive path to a voltage/current source such as a battery) when the parking brake is set (actuated) irrespective of whether the vehicle ignition is turn on or off, and to provide to the operator warning interface system a minus output (e.g., a conductive path to ground) when the parking brake is released irrespective of whether the vehicle ignition is on or off. An example of such a parking brake state detection circuit 502 is illustrated in FIG. 5. By providing either the positive or minus outputs to the operator warning interface system, the operator warning interface system may be prompted to audibly or visually provide an indicator that indicates that the parking brake is not set (as well as an indication that the parking brake is set to prevent, for example, the vehicle from being driven when the parking brake is activated).

Figure 6:
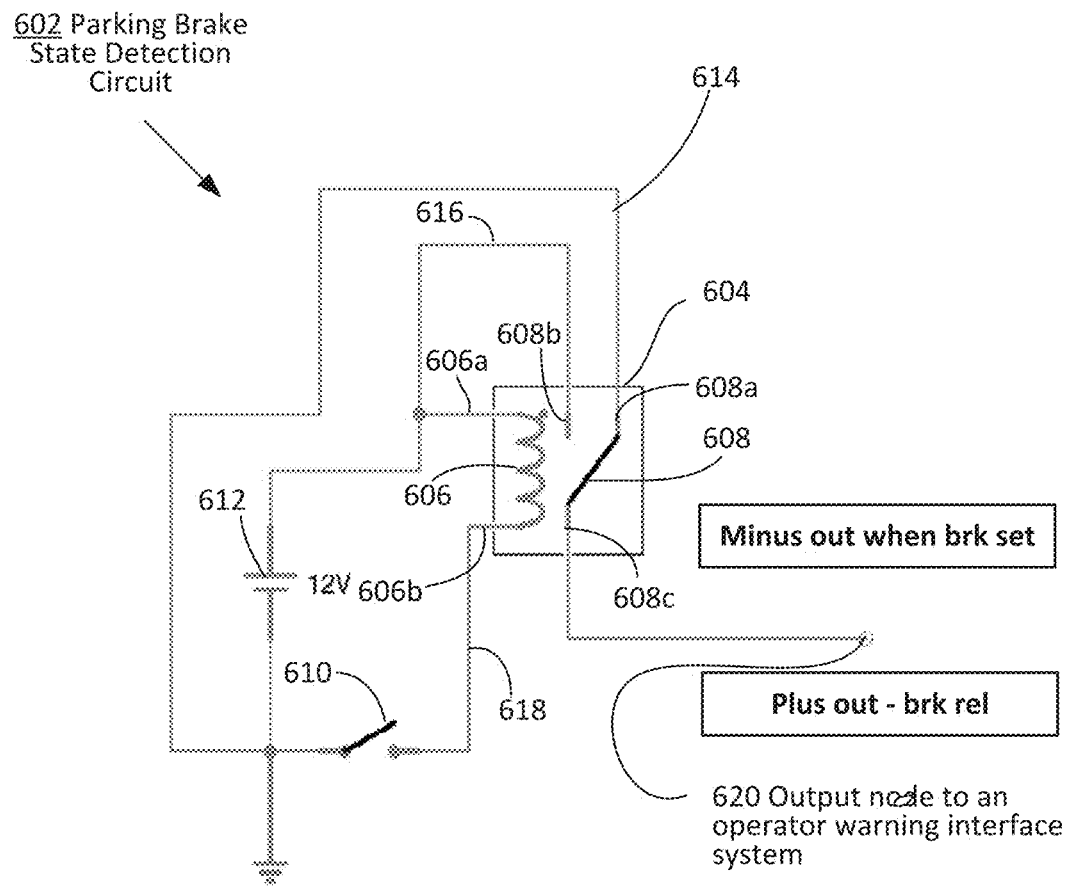
FIG. 6 illustrates another parking brake state detection circuit according to some embodiments.

In a fourth embodiment, a fourth parking brake state detection circuit is provided that when integrated into a safety and warning system of a transportation vehicle, such as a heavy-duty vehicle, may provide to an operator warning interface system a minus output (e.g., a conductive path to ground) when the parking brake is set (actuated) irrespective of whether the vehicle ignition is on or off, and to provide to the operator warning interface system a plus output (e.g., a conductive path to a voltage/current source such as a battery) when the parking brake is released irrespective of whether the vehicle ignition is on or off. Upon being provided with the plus output (e.g., a voltage signal), the operator warning interface system may provide an audio and/or visual alert that indicates that the parking brake of the transportation vehicle is not actuated. An example of such a parking brake state detection circuit 602 according to the fourth embodiment is illustrated in FIG. 6.

As noted above, in various embodiments, each of the parking brake state detection circuits to be described herein may be embodied in a module that may be integrated or incorporated into a safety/brake system of transportation vehicles.

FIG. 1 illustrates a parking brake alert system 100 that may be employed with an air parking brake system of a transportation vehicle, such as a heavy-duty vehicle, in accordance with some embodiments. The parking brake alert system 100 includes a parking brake state detection circuit 102 (which includes at least a first switch 120 and a relay 110 that includes a second switch 114) that is coupled to an operator warning interface system 130. In various embodiments, the parking brake state detection circuit 102 may be modular and may be integrated into, for example, existing safety and warning systems of transportation vehicles. In various embodiments, the operator warning interface system 130 may generate an audio and/or visual alert or warning that indicates that the parking brake of the transportation vehicle is not actuated when the parking brake state detection circuit 102 provides a conductive path to ground to the operator warning interface system 130. For the parking brake state detection circuit 102 to provide the conductive path to ground, two conditions must arise: 1) the ignition of the transportation vehicle is turned off; and 2) the parking brake of the transportation vehicle is sensed or detected as being disabled (i.e., disengaged).

There are number of ways to detect or sense whether the parking brake of a transportation vehicle has been disabled (or engaged). For example, if a transportation vehicle employs an air parking brake system, then a pressure sensor may be employed to determine whether there is at least 6-11 pounds per square inch (psi) of pressure in the delivery line of the air parking brake system. That is, if the pressure of the delivery line of the parking brake air system is greater than 6-11 psi, then this is indicative that the parking brake is disengaged. Other approaches for sensing whether a parking brake has been disabled or actuated include detecting the position of the parking brake switch or other types of parking brake actuators or components (e.g., hand brake release handle, parking brake release knob, parking brake air release valve, and so forth).

The relay 110 includes a coil 112 and a relay switch 114 (which may also be referred to herein as a second switch 114 whereas switch 120 may be referred to as first switch 120). The relay 110, and more particularly, the relay switch 114 may close (as illustrated in FIG. 1) when the ignition of the heavy-duty vehicle is turned-off (e.g., when the ignition switch 140 is open as shown in FIG. 1). As further illustrated in FIG. 1, the parking brake alert system 100, in addition to the parking brake state detection circuit 102 and the operator warning interface system 130, may further include one or more batteries 150a and 150b (e.g., voltage sources), which may be one or more vehicle batteries and/or voltage storage components, and an ignition switch 140.

In some embodiments, the switch 120 may be sensor control switch. For example, in embodiments where an air parking brake system is employed by the transportation vehicle, switch 120 may be a pressure sensor activated switch that may close when a pressure sensor (not illustrated) detects, for example, that pressure in a delivery line of the air parking brake system is greater than, for example, 6-11 psi. In alternative embodiments, the switch 120 may be control by a sensor or mechanism that detects the position or configuration of a parking brake actuator mechanism such as a parking brake switch, a parking brake release lever, a parking brake release knob, or other types of parking brake actuators or components of the transportation vehicle.

In various embodiments, the relay 110, and more particularly, the relay switch 114, may close when ignition of the vehicle is turned-off. More particularly, when coil 112 is not energized (e.g., when the ignition switch 140 is open and not supplying DC current to the coil 112) the relay switch 114 will be in the closed position (as shown in FIG. 1). In contrast, the relay switch 114 may be open when ignition switch 140 is closed (e.g., the vehicle ignition is turned-on) and a magnetic field is created by the coil 112 caused by the electrical current flowing through the coil 112 and resulting in the relay switch 114 being open.

Note that in FIG. 1, both the relay 110 (e.g., the relay switch 114) and the switch 120 are closed, and as a result, the operator warning interface system 130 is provided with ground signals (e.g., a conductive path to ground) that results in the operator warning interface system 130 generating a visual and/or audio alert indicating that the parking brake is not actuated even though the vehicle ignition is turned-off. In particular, when both the relay switch 114 of the relay 110 and switch 120 are closed the relay switch 114, the switch 120, and nodes 160, 162, and 164 form an unbroken conductive path between the operator warning interface system 130 and ground that may be severed or disrupted when, for example, the relay 110 and/or switch 120 are open. For purposes of this description, node 160 may be referred to herein as a "ground" node 160, while node 162 may be referred to as an "output" node 162.

As shown, most if not all the components illustrated in FIG. 1 will each have at least two terminals. For example, first switch 120 includes terminal 120a (which is coupled to node 162) and terminal 120b (which is coupled to node 164). The relay switch 114 includes terminal 114a (which is coupled to node 164) and terminal 114b (which is coupled to node 160). The coil 112 includes terminal 112a (which is coupled to node 160) and terminal 112b (which is coupled to node 161). Although not explicitly identified, the other components (e.g., ignition switch 140, battery 150a, and so forth) illustrated in FIG. 1 also include two terminals each.

In the illustrated embodiment of the parking brake alert system 100 of FIG. 1, relay 110 is disposed between switch 120 and ground (note that relay 110 is coupled to ground node 160 while switch 120 is coupled to output node 162). In some alternative embodiments, however, switch 120 may be disposed between the relay 110 and ground as illustrated in FIG. 3. Note that for purposes of this description, references to a "node" may be broadly construed and may be in reference to a junction where two or more elements connect or may be in reference to a lead, trace, or terminal that is connected to one element (e.g., a switch, a coil, a diode, a battery, and so forth) and that may be potentially coupled to one or more other elements.

Figure 4:
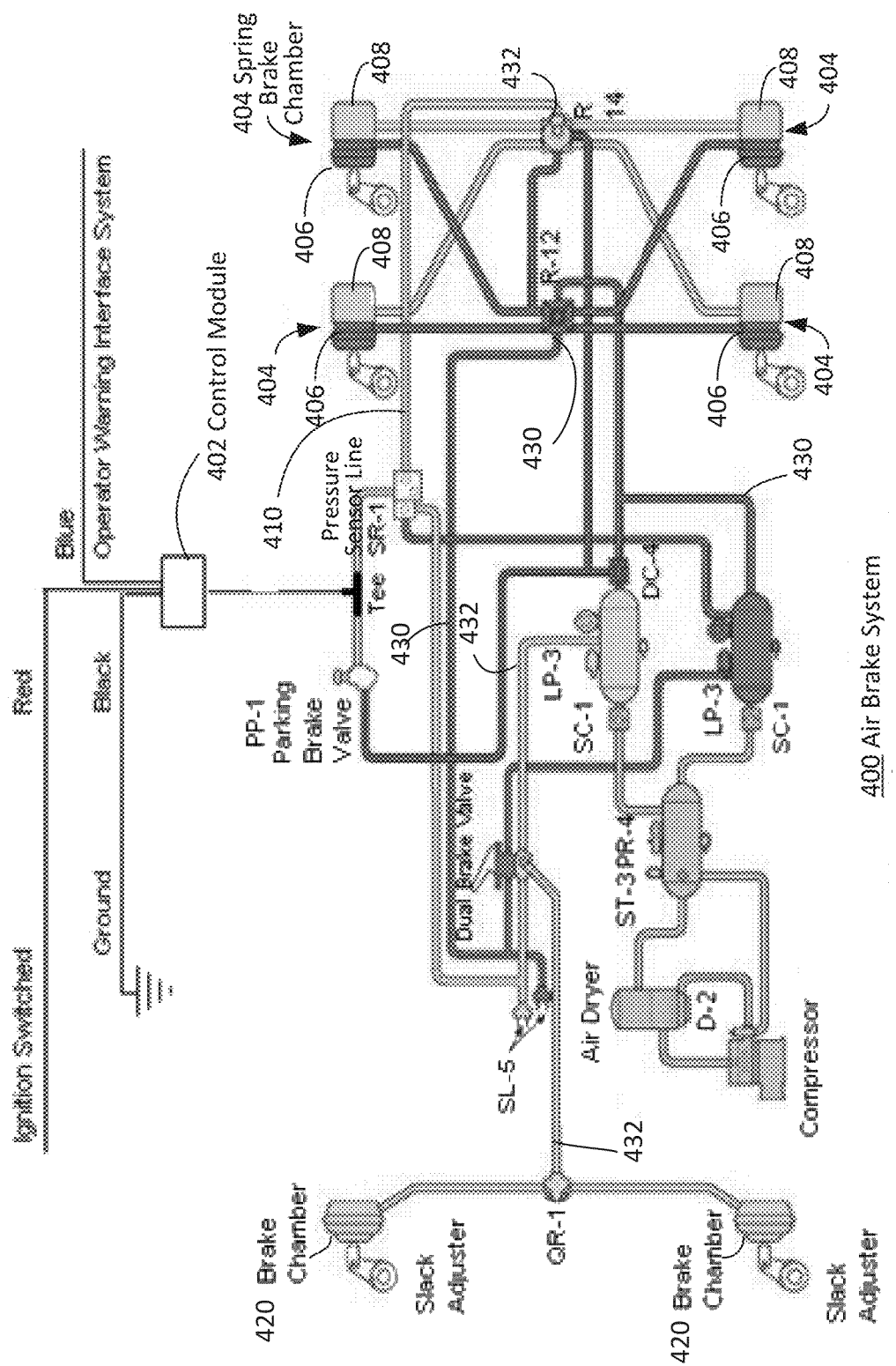
FIG. 4 illustrates an air brake system of a heavy-duty vehicle including a control module according to some embodiments.

As noted above, in various embodiments, the parking brake state circuit 102 may be provided in modular form (e.g., a modular unit) that may be inserted or integrated into existing (or yet to be developed) safety and warning systems of transportation vehicles—see, for example, FIG. 4 where the control module 402 may include, for example, the parking brake state detection circuit 102 of FIG. 1 (note also that the Red, Blue, and Black lines illustrated in FIG. 1 corresponds to the Red, Blue, and Black lines illustrated in FIG. 4). In some embodiments, the parking brake state detection circuit 102 when in modular form may include the first switch 120, relay 110 (which further includes coil 112 and second switch 114), and nodes 160, 161, 162, and 164.

Because the parking brake state detection circuit 102 may be modular, node 161 (Red) may be configured to couple with switch 140, node 160 (Black) may be configured to couple with ground, and node 162 (Blue) may be configured to couple with operator warning interface system 130.

Figure 7:
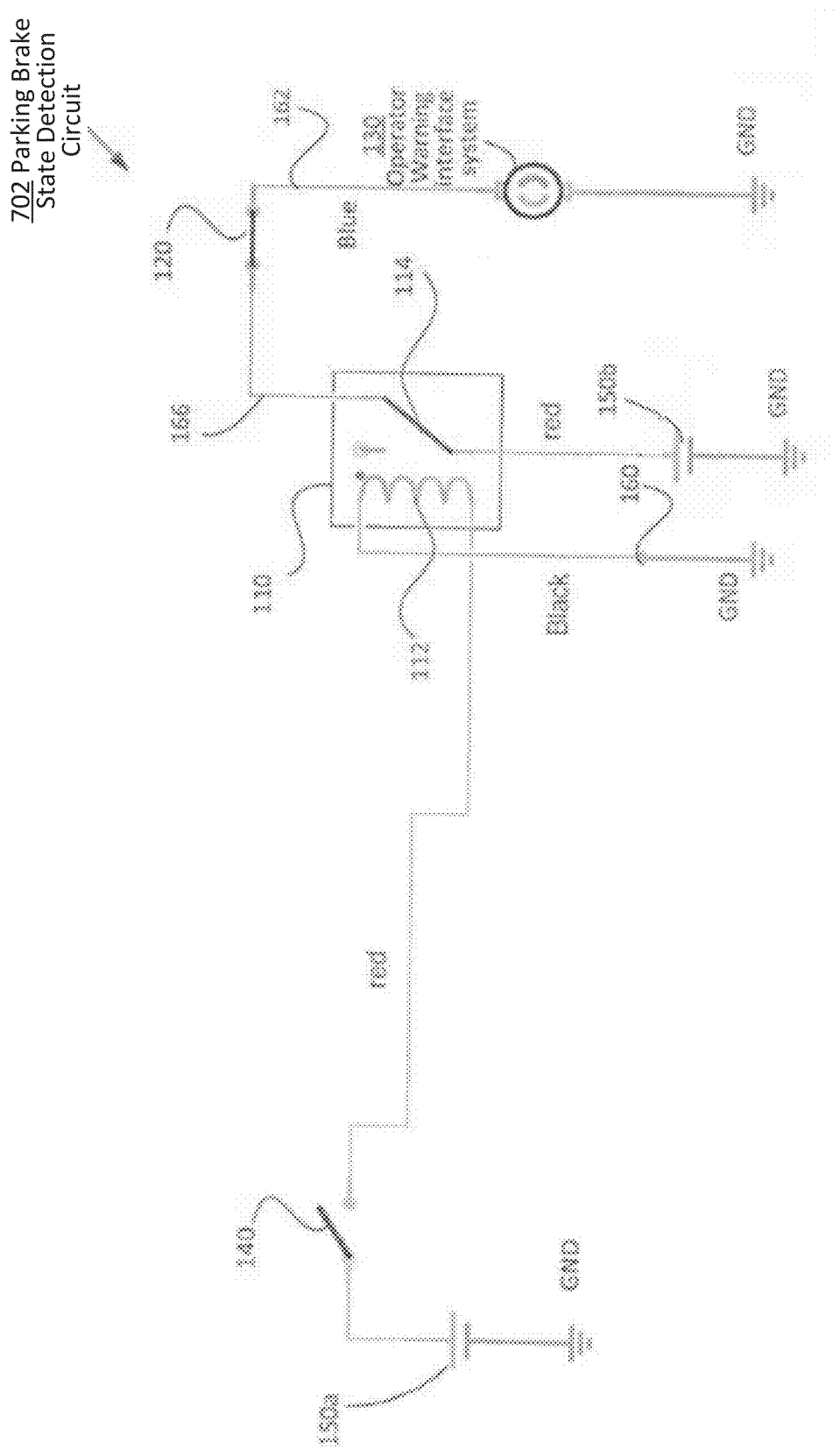
FIG. 7 illustrates another parking brake state detection circuit according to some embodiments.

Note that although the parking brake state detection circuit 102 (which includes the relay 110 and the switch 120) illustrated in FIG. 1 may provide to an operator warning interface system 130 a conductive path to ground when the vehicle ignition is turned off and when the parking brake is disengaged, in alternative embodiments, a parking brake state detection circuit 702 is provided and as illustrated, for example, in FIG. 7 that may provide to an operator warning interface system 130 a conductive path to a battery 150$b$ (e.g., a conductive path to a voltage source when the vehicle ignition is turned off and the parking brake is detected as being disengaged) rather than a conductive path to ground. That is, in some cases an operator warning interface system 130, as illustrated in FIG. 7, may be configured such that it will generate an audio and/or visual alarm that indicates that the parking brake is disengaged only when the operator warning interface system 130 is provided with a conductive path to a voltage source rather than to ground as was described with respect to the parking brake state detection circuit 102 of FIG. 1. Note that the only significant difference between the parking brake alert system 100 of FIG. 1 and the parking brake alert system 700 of FIG. 7 is the location of battery 150$b$ (in FIG. 1, battery 150$b$ is located between the Operator warning interface system 130 and ground while in FIG. 7 the battery 150$b$ is located between relay switch 114 and ground. Thus, parking brake state detection circuit 702 of FIG. 7 essentially mirrors the parking brake state detection circuit 102 of FIG. 1.

FIG. 2 illustrates another parking brake alert system 200 that may be employed with a parking brake system of a transportation vehicle, such as a heavy-duty vehicle, in accordance with some embodiments. In various embodiments, the parking brake system may be any one of a variety of parking brake systems including a hydraulic parking brake system, an air parking brake system, or the like. The parking brake alert system 200 includes a parking brake state detection circuit 202 (which includes a first relay 210 and a second relay 220) that is coupled to an operator warning interface system 230. Similar to the parking brake state detection circuit 102 of FIG. 1, in various embodiments, the parking brake state detection circuit 202 may be provided in modular form that may be inserted or integrated into the existing safety and warning systems of transportation vehicles.

In various embodiments, and like the operator warning interface system 130 of FIG. 1, the operator warning interface system 230 may be configured to generate an audio and/or visual warning that indicates that the parking brake of the heavy-duty vehicle is disengaged when the parking brake state detection circuit 202 provides a conductive path to ground to the operator warning interface system 230. For the parking brake state detection circuit 202 to provide the conductive path to ground, two conditions must arise: 1) the ignition of the transportation vehicle is turned off; and 2) the parking brake of the transportation vehicle is sensed or detected as being disabled (i.e., disengaged).

The first relay 210 includes a first coil 212 and a first relay switch 214, and like the relay switch 114 of FIG. 1, the first relay switch 214 in various embodiments may close when ignition switch 240 is open as illustrated in FIG. 2 (e.g., the ignition switch 240 will be open when transportation vehicle ignition is turned off). The second relay 220 includes a second coil 222 and a second relay switch 224. The second relay 220, and more particularly, the second relay switch 224 will close when the parking brake switch 242 is open. That is, the parking brake switch 242 will be open (as shown in FIG. 2) when the transportation vehicle's parking brake is detected as not being actuated. For example, when a parking brake activation mechanism such as a parking brake lever, a parking brake switch, or a parking brake pedal is detected as being in a configuration or position for disabling the parking brake, then the parking brake switch 242 will be open. Of course, if the parking brake system is an air parking brake system, then a pressure sensor may be used to detect air pressure greater than 6-11 psi in the delivery line of the air parking brake system as described above in order to determine that the air parking brake is disengaged.

Thus, when the parking brake state detection circuit 202 has been integrated into the parking brake alert system 200 and the first relay switch 214 and the second relay switch 224 are disposed in series between the operator warning interface system 230 and ground, they form at least a part of a breakable conductive path between the operator warning interface system 230 and ground. When the first and second relay switches 214 and 224 are closed, they form an unbroken conductive path between the operator warning interface system 230 and ground.

As further illustrated, the parking brake alert system 200 may also include one or more batteries 250$a$ and 250$b$ (which may be one or more 12 V batteries in some embodiments), an ignition switch 240, diodes 270$a$ and 270$b$, and connector 272. The diodes 270$a$ and 270$b$ are coupled to node 266. The connector 272 may be coupled to a line 274 (e.g., a trace or lead) that may be coupled to a standard (e.g., conventional) parking brake warning system (not illustrated) that is designed to provide, for example, a warning light that the parking brake is actuated when the vehicle ignition is on. As should be noted, a standard parking brake warning system may be commonly found in both passenger, as well as heavy-duty vehicles to prevent a vehicle operator from moving the vehicle when the parking brake is still engaged.

Note that in some cases a standard parking brake warning system may provide a warning light that the parking brake is actuated only when the parking brake switch 242 is closed (e.g., the parking brake is engaged) and the ignition switch is closed (e.g., vehicle ignition is turned on). That is, in some cases, an audio and/or visual parking brake alert will be generated by the standard parking brake warning system when it is provided with ground signals (e.g., providing conductive path to ground) via a closed parking brake switch 242 and through connector 272 and diode 270$b$. Diodes 270$a$ and 270$b$ are coupled to node 266. As one of ordinary skill in the art will recognize each of the diodes 270$a$ and 270$b$ only permits electrical currents to flow in one direction and prevents electrical currents from flowing in the opposite direction. As a result, electrical current from the standard parking brake warning system will not flow to the coil 222, while electrical current from battery 250$a$ via the coil 222 will not flow to the standard parking brake warning system. Note that in some cases batteries 250$a$ and 250$b$ may be the same battery.

In order for the operator warning interface system 230 to be provided with ground signals via an unbroken conductive path to ground, the first relay 210 (e.g., the first relay switch 214) and the second relay 220 (e.g., the second relay switch 224) must be closed. For the first relay 210 (e.g., first relay switch 214) to be closed, ignition switch 240 must be open. Meanwhile for the second relay 220 (e.g., second relay switch 224) to be closed, parking brake switch 242 must be open. In FIG. 2, both the first relay switch 214 and the second relay switch 224 are depicted as being closed. When the first relay switch 214 and the second relay switch 224 are closed, the closed first and second relay switches 214 and 224, and nodes 260, 262, and 264 form an unbroken conductive path between the operator warning interface system 230 and ground. For purposes of this description, node 260 may be referred to herein as a "ground" node 260.

As shown, most if not all the components illustrated in FIG. 2 will each have at least two terminals. For example, first relay switch 214 includes terminal 214a (which is coupled to node 262) and terminal 214b (which is coupled to node 264). The first coil 212 includes terminal 212a (which is coupled to node 260) and terminal 212b (which is coupled to node 261). The second relay switch 224 includes terminal 224a (which is coupled to node 264) and terminal 224b (which is coupled to node 260). The second coil 222 includes terminal 222a (which is coupled to node 263) and terminal 222b (which is coupled to node 265). Although not explicitly identified, the other components (e.g., ignition switch 240, battery 250a, battery 250b, diode 270a, and so forth) illustrated in FIG. 2 also include two terminals each.

Note that although the first relay 210 in FIG. 2 is illustrated as being disposed between the second relay 220 and the operator warning interface system 230, in other embodiments, the positions of the first relay 210 and the second relay 220 relative to the operator warning interface system 230 may be flipped along the breakable conductive path so that the second relay 220 is between the first relay 210 and the operator warning interface system 230.

As noted above, and similar to the parking brake state circuit 102 of FIG. 1, the parking brake state circuit 202 may be provided in modular form that may be inserted or integrated into existing (or yet to be developed) safety and warning systems of transportation vehicles. In some embodiments, the parking brake state circuit 202 when in modular form may include the first relay 210 (which further includes the first coil 212 and the first relay switch 214), the second relay 220 (which further includes the second coil 222 and the second relay switch 224), nodes 260, 261, 262, 263, 264, 265, 266, and 267, diodes 270a and 270b, and connector 272. Note that in various alternative embodiments, one or more of these components may be omitted (e.g., connector 272, diode 270a, and diode 270b). Because the parking brake state detection circuit 202 may be modular, node 260 may be configured to couple with ground, node 261 may be configured to couple with switch 240, node 262 may be configured to couple with operator warning interface system 230, node 263 configured to couple with battery 250a, and node 266 may be configured to couple with switch 242. Also, connector 272 is configured to couple with node 274.

Figure 8:
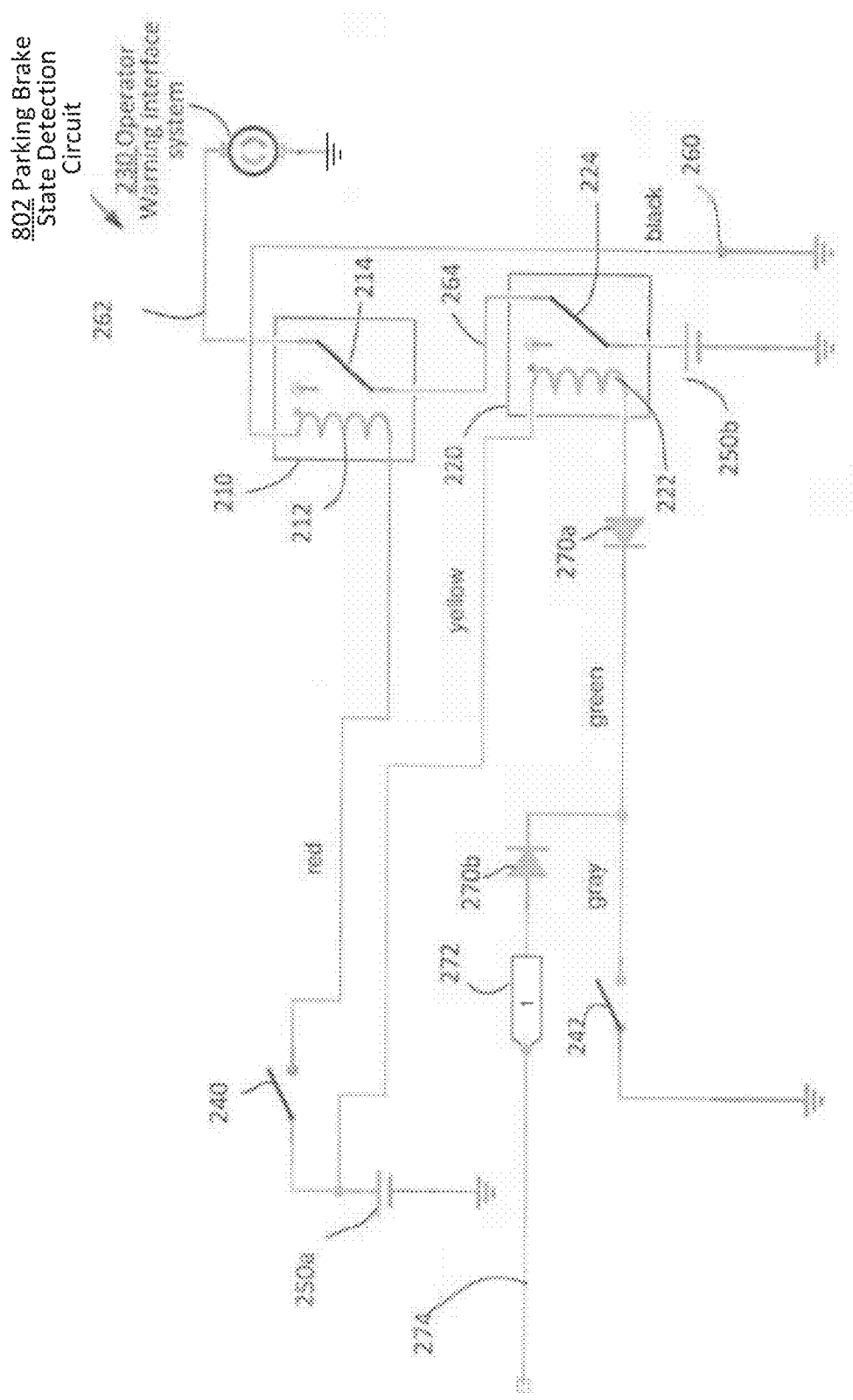
FIG. 8 illustrates another parking brake state detection circuit according to some embodiments.

Note that although the parking brake state detection circuit 202 (which includes the first and second relays 210 and 220) illustrated in FIG. 2 may provide to an operator warning interface system 230 a conductive path to ground when the vehicle ignition is turned off and when the parking brake is disengaged, in alternative embodiments, a parking brake state detection circuit 802 is provided and as illustrated, for example, in FIG. 8 that may be configured to provide to an operator warning interface system 230 a conductive path to a battery 250b (e.g., voltage source when the vehicle ignition is turned off and the parking brake is detected as being disengaged) rather than a conductive path to ground. That is, in some cases an operator warning interface system 230, as illustrated in FIG. 8, may be configured such that it will generate an audio and/or visual alarm that indicates that the parking brake is disengaged only when the operator warning interface system 230 is provided with a conductive path to a voltage source rather than to ground as was described with respect to the parking brake state detection circuit 202 of FIG. 2. Note that the only difference between the parking brake alert system 200 of FIG. 2 and the parking brake alert system 800 of FIG. 8 is the location of battery 250b (in FIG. 2, battery 250b is located between the operator warning interface system 230 and ground while in FIG. 8 the battery 250b is located between second relay switch 214 and ground).

FIG. 3 illustrates another parking brake alert system 300 that mirrors the parking brake alert system 100 of FIG. 1 except that the location of the first switch 120 and the location of the relay 110 along the breakable conductive path between the operator warning interface system 130 and ground are reversed. As in FIG. 1, the first switch 120 and the relay 110 (which includes a coil 112 and a second switch 114, which may also be referred to as a "relay" switch 114) may be part of a parking brake state detection circuit 302 that may be in modular form and that may be incorporated into, for example, existing safety and warning systems of transportation vehicles. And although the relative positions of the first switch 120 and the relay 110 have been reversed, the overall functionality and behavior of the parking brake alert system 300 are the same as the overall functionality and behavior of the parking brake alert system 100 of FIG. 1.

As noted above, in various embodiments, the parking brake state circuit 302 may be provided in modular form (e.g., modular unit) that may be inserted or integrated into existing (or yet to be developed) safety and warning systems of transportation vehicles—see, for example, FIG. 4 where the control module 402 may include, for example, the parking brake state detection circuit 302 of FIG. 3 (note also that the Red, Blue, and Black lines illustrated in FIG. 3 corresponds to the Red, Blue, and Black lines illustrated in FIG. 4. In some embodiments, the parking brake state detection circuit 302 when in modular form may include the first switch 120, relay 110 (which further includes coil 112 and second switch 114), and nodes 160, 161, 162, and 164a. Because the parking brake state detection circuit 302 may be modular, node 161 (Red) may be configured to couple with switch 140, node 160 (Black) may be configured to couple with ground, and node 162 (Blue) may be configured to couple with operator warning interface system 130.

Figure 9:
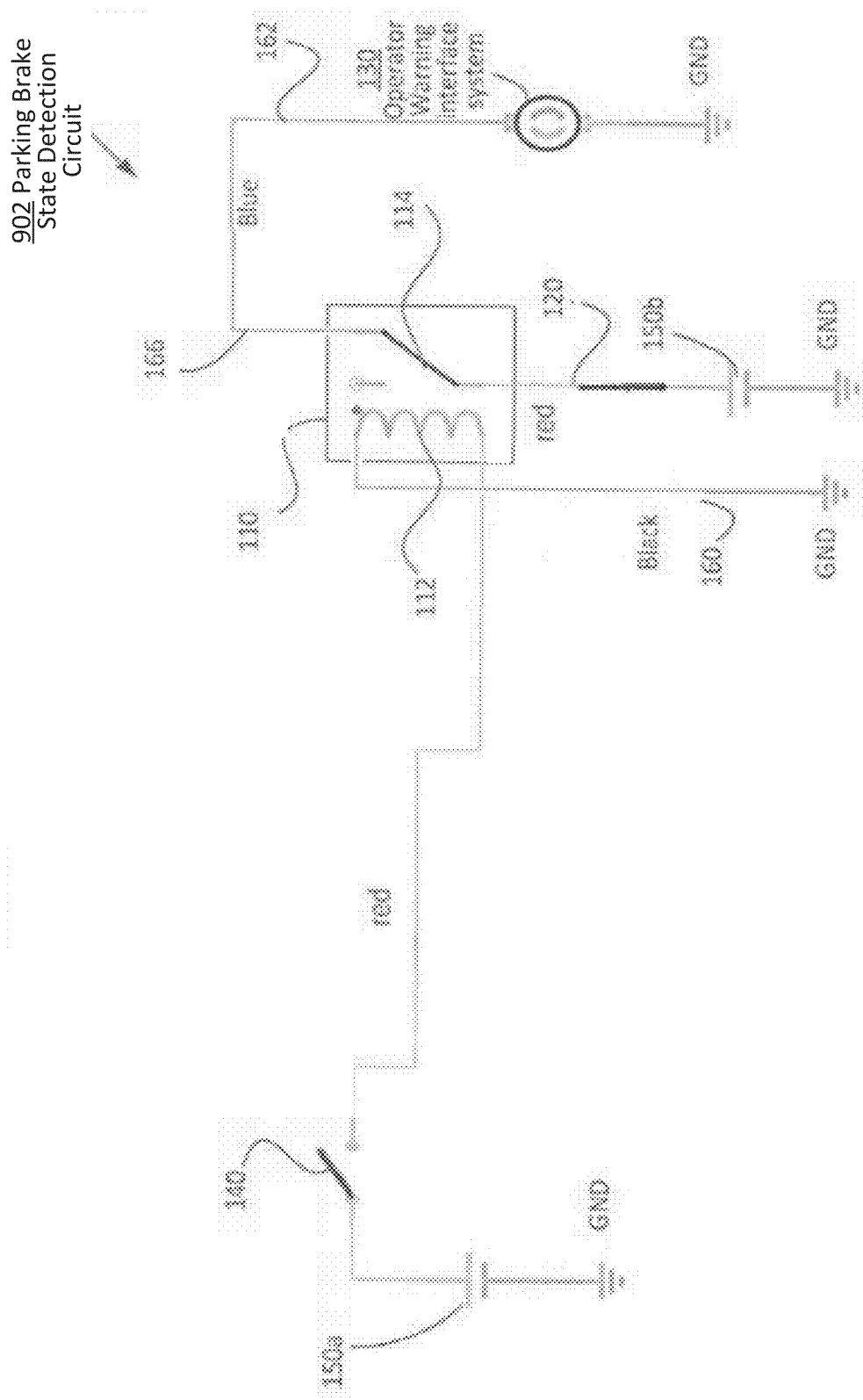
FIG. 9 illustrates another parking brake state detection circuit according to some embodiments.

Note that although the parking brake state detection circuit 302 (which includes the relay 110 and the switch 120) illustrated in FIG. 3 may provide to an operator warning interface system 130 a conductive path to ground when the vehicle ignition is turned off and when the parking brake is disengaged, in alternative embodiments, a parking brake state detection circuit 902 is provided and as illustrated, for example, in FIG. 9 that may be configured to provide to an operator warning interface system 130 a conductive path to a battery 150b (e.g., a conductive path to a voltage source when the vehicle ignition is turned off and the parking brake is detected as being disengaged). That is, in some cases an operator warning interface system 130, as illustrated in FIG. 9, may be configured such that it will generate an audio and/or visual alarm that indicates that the parking brake is disengaged only when the operator warning interface system 130 is provided with a conductive path to a voltage source rather than to ground as was described with respect to the parking brake state detection circuit 302 of FIG. 3. Note that the only significant difference between the parking brake alert system 300 of FIG. 3 and the parking brake alert system 900 of FIG. 9 is the location of battery 150b (in FIG. 3, battery 150b is located between the operator warning interface system 130 and ground while in FIG. 9 the battery 150*b* is located between switch 120 and ground.

FIG. 4 illustrates an example air brake system 400 for a transportation vehicle including a control module 402 in accordance with various embodiments. In various embodiments, the control module 402 may include a parking brake state detection circuit, such as the parking brake state detection circuit 102 or 302 of FIG. 1 or 3, or the other parking brake state detection circuits described herein (e.g., as shown in FIG. 2, 5, or 6). In some embodiments, the air brake system 400 may be for a heavy-duty vehicle with a front axle and dual rear axles. The air brake system 400 includes four spring brake chambers 404 for the dual rear axles and two brake chambers 420 for the front axle. As one of ordinary skill in the art will recognize, such an air brake system 400 may include a service brake subsystem 430 and a parking brake subsystem 432, that may be integrated into a single air brake system 400. Note that coming out of the control module 402 are a red line, a blue line, and a black line, that represents the red, blue, and black lines illustrated in FIGS. 1 and 3. The air brake system 400 includes four spring brake chambers 404 for the duel rear axles. Each of the spring brake chambers 404 include a service brake section 406 and a spring brake section 408, each section forming separate chambers. A spring brake section 408 includes a large coil spring. Spring brake sections 408 apply the brakes by means of the large coil spring that provides enough force to hold the brakes in the applied position, instead of using air to apply the brakes. The spring brakes acts as the parking brakes and will apply when air pressure leaves the brake chamber (e.g., spring brake section 408) and release when air pressure builds up in the brake chamber (e.g., spring brake section 408).

In various embodiments, the control module 403 may include (or be coupled to) a pressure sensor that monitors, via pressure sensor line, the pressure of a delivery line 410 to the spring cams (e.g., spring brake sections 408) of the parking brake. The air pressure (or the lack of air pressure) sensed by the pressure sensor may cause, for example, the switch 120 of FIGS. 1 and 3 to open or close.

FIG. 5 illustrates another parking brake state detection circuit 502 that may be employed with a parking brake system of a transportation vehicle, such as a heavy-duty vehicle, in accordance with various embodiments. In some embodiments, the brake state detection circuit 502 may be configured to provide to an operator warning interface system a plus output (e.g., a conductive path to a voltage/current source such as the cathode terminal of a battery) when the parking brake of the transportation vehicle is set (actuated or engaged), and to provide to the operator warning interface system a minus output (e.g., a conductive path to ground) when the parking brake is released (e.g., disengaged). In response to receiving the plus or minus outputs, the operator warning interface system may be prompted to generate an audio and/or visual alert that indicates whether the parking brake is actuated or not actuated. Note that unlike the circuits illustrated in FIGS. 1-3, the provisions of the plus or minus outputs to an operator warning interface system do not depend on whether the vehicle ignition is on or off.

As illustrated, the parking brake state detection circuit 502 may be provided in modular form that may be integrated into, for example, existing safety and warning systems of transportation vehicles and that may include at least a relay 504 that further includes coil 506 and relay switch 508. As illustrated in FIG. 5, the parking brake state detection circuit 502 may be coupled to a brake switch 510. Also shown in FIG. 5, the parking brake state detection circuit 502 may be coupled to a battery 512, which may provide voltage/current to the parking brake state detection circuit 502. The parking brake state detection circuit 502 further includes a node 514 that is configured to couple with the cathode of battery 512, a node 516 that is configured to couple with ground, node 518 that is configured to couple with switch 510, and output node 520 configured to couple with an operator warning interface system (not illustrated). Coil 506 includes terminal 506*a* (which is coupled to node 514) and terminal 506*b* (which is coupled to node 518). In contrast, switch 508 includes terminal 508*a* (which is coupled to node 513), terminal 508*b* (which is coupled to node 516), and terminal 508*c* (which is coupled to node 520).

When the parking brake of the transportation vehicle is actuated, the brake switch 510 will be open (as illustrated in FIG. 5), and as a result, coil 506 will not be energized and the relay switch 508 will couple the output node 520 to node 514, which provides plus output (e.g., conductive path to the cathode of the battery) to the operator warning interface system via the output node 520. On the other hand, when the parking brake of the vehicle is disengaged (not actuated), the brake switch 510 will be closed, and as a result, coil 506 will be energized and the relay switch 508 will couple the output node 520 to node 516, which provides minus output (e.g., conductive path to ground) to the operator warning interface system via the output node 520.

In various embodiments, the brake switch 510 may be a sensor control switch that may be coupled to a sensor, such as a pressure sensor that may sense, for example, the pressure of a delivery line of an air parking brake system as described previously. Alternatively, the opening and closing of the brake switch 510 may be control by a sensor or mechanism that detects the position or configuration of parking brake actuator mechanism such as a parking brake switch, a parking brake release lever, a parking brake release knob, or other types of parking brake actuators or components of the transportation vehicle.

FIG. 6 illustrates yet another parking brake state detection circuit 602 that may be employed with a parking brake system of transportation vehicle, such as a heavy-duty vehicle, and that is designed to provide to an operator warning interface system a plus output (e.g., a conductive path to a voltage/current source such as the cathode terminal of a battery) when the parking brake is released (e.g., disabled), and to provide to the operator warning interface system a minus output (e.g., a conductive path to ground) when the parking brake is set (e.g., actuated). In response to receiving the plus or minus outputs, the operator warning interface system may be prompted to provide an audio and/or visual alert that indicates whether the parking brake is actuated or not actuated. Note that similar to the circuit illustrated in FIG. 6, the provisions of the plus or minus outputs to an operator warning interface system do not depend on whether the vehicle ignition is on or off.

As illustrated, the parking brake state detection circuit 602 may be provided in modular form that may be integrated into, for example, existing safety and warning systems of transportation vehicles and that may include at least a relay 604 that further includes coil 606 and relay switch 608. As illustrated in FIG. 6, the parking brake state detection circuit 602 may be coupled to a brake switch 610. As further illustrated in FIG. 6, the parking brake state detection circuit 602 may be coupled to a battery 612, which may provide voltage/current to the parking brake state detection circuit 602. The parking brake state detection circuit 602 further includes a node 614 that is configured to couple with ground, a node 616 that is configured to couple with the cathode of battery 612, a node 618 that is configured to couple with switch 610, and output node 620 configured to couple with an operator warning interface system (not illustrated). Coil 606 includes terminal 606a (which is coupled to node 616) and terminal 606b (which is coupled to node 518). In contrast, switch 508 includes terminal 608a (which is coupled to node 614), terminal 608b (which is coupled to node 616), and terminal 608c (which is coupled to node 620).

When the parking brake of the transportation vehicle is actuated or engaged, the brake switch 610 will be open (as illustrated in FIG. 6), and as a result, coil 606 will not be energized and the relay switch 608 will couple the output node 620 to node 614, which provides minus output (e.g., conductive path to ground) to the operator warning interface system via the output node 620. On the other hand, when the parking brake of the vehicle is disengaged (not actuated), the brake switch 610 will be closed, and as a result, coil 606 will be energized and the relay switch 608 will couple the output node 620 to node 616, which provides plus output (e.g., conductive path to the cathode of the battery 612) to the operator warning interface system via the output node 620.

In various embodiments, the brake switch 610 may be a sensor control switch that may be coupled to a sensor, such as a pressure sensor that may sense, for example, the pressure of a delivery line of an air parking brake system as described previously. Alternatively, the opening and closing of the brake switch 610 may be control by a sensor or mechanism that detects the position or configuration of parking brake actuator mechanism such as a parking brake switch, a parking brake release lever, a parking brake release knob, or other types of parking brake actuators or components of the transportation vehicle.

FIG. 7 illustrates another parking brake alert system 700 that may be employed with an air parking brake system of a transportation vehicle in accordance with some embodiments. The parking brake alert system 700 includes a parking brake state detection circuit 702 that further includes switch 120 and relay 110 (which further includes coil 112 and switch 114). The parking brake state detection circuit 702 mirrors the parking brake state detection circuit 102 of FIG. 1. The only significant difference between the parking brake alert system 700 of FIG. 7 and the parking brake alert system 100 of FIG. 1 is the location of battery 150b. That is, in FIG. 1, battery 150b is disposed between the operator warning interface system 130 and ground while in FIG. 7 battery 150b is disposed between switch 114 and ground. As a result, when the parking brake is disengaged (e.g., switch 120 is closed) and when the vehicle ignition is turned off (e.g., switch 114 is closed), a conductive path to battery 150b is provided to the operator warning interface system 130 instead of a conductive path to ground as was the case in FIG. 1.

FIG. 8 illustrates another parking brake alert system 800 that may be employed with an air parking brake system of a transportation vehicle in accordance with some embodiments. The parking brake alert system 800 includes a parking brake state detection circuit 802 that further includes a first relay 210 (which includes a first coil 212 and a first relay switch 214) and a second relay 220 (which further includes a second coil 222 and a second relay switch 224). The parking brake state detection circuit 802 mirrors the parking brake state detection circuit 202 of FIG. 2. The only significant difference between the parking brake alert system 800 of FIG. 8 and the parking brake alert system 200 of FIG. 2 is the location of battery 150. That is, in FIG. 2, battery 150b is disposed between the operator warning interface system 230 and ground while in FIG. 8 battery 150b is disposed between switch 224 and ground. As a result, when the parking brake is disengaged (e.g., switch 224 is closed) and when the vehicle ignition is turned off (e.g., switch 214 is closed), a conductive path to battery 150b is provided to the operator warning interface system 230 instead of a conductive path to ground as was the case in FIG. 2.

FIG. 9 illustrates another parking brake alert system 900 that may be employed with an air parking brake system of a transportation vehicle in accordance with some embodiments. The parking brake alert system 900 includes a parking brake state detection circuit 902 that further includes switch 120 and relay 110 (which further includes coil 112 and switch 114). The parking brake state detection circuit 902 mirrors the parking brake state detection circuit 302 of FIG. 3. The only significant difference between the parking brake alert system 900 of FIG. 9 and the parking brake alert system 300 of FIG. 3 is the location of battery 150b. That is, in FIG. 3, battery 150b is disposed between the operator warning interface system 130 and ground while in FIG. 9 battery 150b is disposed between switch 120 and ground. As a result, when the parking brake is disengaged (e.g., switch 120 is closed) and when the vehicle ignition is turned off (e.g., switch 114 is closed), a conductive path to battery 150b is provided to the operator warning interface system 130 instead of a conductive path to ground as was the case in FIG. 3.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A circuit comprising:
    a first switch that closes in response to a parking brake of a transportation vehicle being disengaged; and
    a second switch that is coupled to the first switch and that closes when an ignition of the transportation vehicle is turned off;
    wherein the first switch and the second switch are disposed in series between a first node and a second node, the first node to couple with an operator warning interface system and the second node to couple with ground, the first switch and the second switch forming at least a portion of a conductive path between the operator warning interface system and the ground when the first node is coupled to the operator warning interface system and the second node is coupled to the ground and when the first and second switches are closed, the operator warning interface system to generate an audio and/or visual alert to indicate that the parking brake of the transportation vehicle is disengaged when the operator warning interface system is provided with the conductive path to the ground.

2. The circuit of claim 1, wherein the first switch to close in response to a pressure sensor detecting that pressure in a delivery line of an air brake system of the transportation vehicle exceeds at least six pounds per square inch (psi) of pressure.

3. The circuit of claim 1, wherein the first switch is controlled by a sensor that detects position or configuration of a parking brake actuator mechanism.

4. The circuit of claim 1, wherein the second switch is part of a relay, the relay further includes a coil, and the second switch to close when there is no electrical current flowing through the coil, and will be open when there is electrical current flowing through the coil.

5. The circuit of claim 4, wherein the coil having a first terminal and a second terminal, the first terminal of the coil to couple with the ground and the second terminal of the coil to couple to an ignition switch that closes when the ignition of the transportation vehicle is turned on and to open when the ignition of the transportation vehicle is turned off, the ignition switch when closed couples the coil to a battery and when open decouples the coil from the battery.

6. The circuit of claim 1, wherein each of the first and second switches having a first and a second terminal, the first terminal of the first switch being coupled to the second terminal of the second switch, the second terminal of the first switch coupled to the first node and the first terminal of the second switch coupled to the second node.

7. The circuit of claim 1, wherein each of the first and second switches having a first and a second terminal, the first terminal of the first switch being coupled to the second terminal of the second switch, the second terminal of the first switch coupled to the second node and the first terminal of the second switch coupled to the first node.

8. The circuit of claim 1, wherein the first node is coupled to the operator warning interface system and the second node is coupled to the ground.

9. A parking brake state detection circuit for use in a transportation vehicle, comprising:
   a first relay including a first relay switch that closes when an ignition of the transportation vehicle is turned off; and
   a second relay including a second relay switch that is coupled to the first relay switch and that closes when a parking brake of the transportation vehicle is disengaged;
   wherein the first relay switch and the second relay switch to be disposed in series between an operator warning interface system and ground to form a breakable conductive path between the operator warning interface system and the ground, the first relay switch and the second relay switch to form at least a portion of an unbroken conductive path between the operator warning interface system and the ground when the first relay switch and the second relay switch are closed, the operator warning interface system to generate an audio and/or visual alert to indicate that the parking brake of the transportation vehicle is disengaged when the operator warning interface system is provided with the unbroken conductive path to the ground.

10. The parking brake state detection circuit of claim 9, wherein the first relay includes a first coil, and wherein the first relay switch to close when there is no electrical current flowing through the first coil, and to be open when there is electrical current flowing through the first coil.

11. The parking brake state detection circuit of claim 10, wherein the first coil having a first terminal and a second terminal, the first terminal of the first coil to couple with the ground and the second terminal of the first coil to couple to an ignition switch that closes when the ignition of the transportation vehicle is turned on and that opens when the ignition of the transportation vehicle is turned off, the ignition switch when closed couples the coil to a battery and when open decouples the coil from the battery.

12. The parking brake state detection circuit of claim 9, wherein the second relay includes a second coil, and wherein the second relay switch to close when there is no electrical current flowing through the second coil, and to be open when there is electrical current flowing through the second coil.

13. The parking brake state detection circuit of claim 12, wherein the second coil having a first terminal and a second terminal, the first terminal of the second coil to couple to a battery and the second terminal of the second coil to couple to a switch that opens when the parking brake of the transportation vehicle is disengaged, and that closes when the parking brake of the transportation vehicle is actuated, wherein when the switch is closed the second coil is coupled to the ground, and when the switch is open the second coil is decoupled from the ground.

14. The parking brake state detection circuit of claim 13, wherein the second terminal of the second coil to couple with the switch via a diode.

15. The parking brake state detection circuit of claim 13, wherein the switch opens in response to a pressure sensor detecting that pressure in a delivery line of an air brake system of the transportation vehicle exceeds at least six pounds per square inch (psi) of pressure.

16. The parking brake state detection circuit of claim 13, wherein the switch is controlled by a sensor that detects position or configuration of a parking brake actuator mechanism.

17. The parking brake state detection circuit of claim 9, wherein each of the first relay switch and the second relay switch having a first terminal and a second terminal, respectively, the first terminal of the first relay switch coupled to the first terminal of the second relay switch, the second terminal of the first relay switch to couple with the operator warning interface system and the second terminal of the second relay switch to couple with the ground.

18. The parking brake state detection circuit of claim 9, wherein each of the first relay switch and the second relay switch having a first terminal and a second terminal, respectively, the first terminal of the first relay switch coupled to the first terminal of the second relay switch, the second terminal of the first relay switch to couple with the ground and the second terminal of the second relay switch to couple with the operator warning interface system.

19. A parking brake state detection circuit for use in a transportation vehicle, comprising:
   a first node to couple to ground;
   a second node to couple to cathode of a battery;
   a third node to couple to an operator warning interface system that, when prompted, provides an audio and/or visual indicator for indicating that a parking brake of the transportation vehicle is disengaged; and a relay switch to conductively link the third node to the first node when the parking brake of the vehicle is not set and to conductively link the third node to the second node when the parking brake of the transportation vehicle is actuated, wherein the relay switch is part of a relay that further includes a coil, wherein when an electrical current flows through the coil the relay switch will conductively link the third node to the first node and when no electrical current is flowing through the coil, the relay switch will conductively link the third node to the second node, the coil having a first terminal and a second terminal, the first terminal coupled to a battery and the second terminal coupled to a switch, where the switch to be open when the parking brake is actuated, and to be closed when the parking brake is disengaged, and when the switch is closed, the switch links the second terminal of the coil to the ground.

\* \* \* \* \*